June 28, 1966 D. E. WEYER 3,257,689
PRODUCTION OF TUBING HAVING PLASTIC MEMORY
Filed Nov. 2, 1964 2 Sheets-Sheet 1

INVENTOR.
DONALD E. WEYER
BY
ATTORNEY

June 28, 1966  D. E. WEYER  3,257,689
PRODUCTION OF TUBING HAVING PLASTIC MEMORY
Filed Nov. 2, 1964  2 Sheets-Sheet 2

INVENTOR.
DONALD E. WEYER
BY
*Howard W. Hermann*
ATTORNEY

United States Patent Office 3,257,689
Patented June 28, 1966

3,257,689
PRODUCTION OF TUBING HAVING
PLASTIC MEMORY
Donald E. Weyer, Midland, Mich., assignor to Dow Corning Corporation, Midland, Mich., a corporation of Michigan
Filed Nov. 2, 1964, Ser. No. 408,123
4 Claims. (Cl. 18—19)

The present invention relates to the manufacture of polymeric tubing and more particularly, to the manufacture of tubing having a plastic memory.

Polymeric materials having plastic memory are rapidly finding uses in industry. By tubing having a plastic memory is meant a tube of polymeric material which is heat-unstable, i.e. materials which are treated in a manner to provide a characteristic which allows them to retain their shape and dimensions under low and normal temperature conditions, but which, when heat is applied in sufficient amount to raise them to a critical temperature, tends to cause them to shrink to their pretreatment shape and dimensions. Materials having these characteristics are commonly called "heat-shrinkable." Such materials are described in U.S. Patent No. 3,086,242, and in U.S. Patent application Serial No. 296,486, filed July 22, 1963. Particularly in fields such as electrical insulation this characteristic has found many applications. A cable, for example, may be slipped into a sleeve of heat shrinkable tubing and by application of heat the material contracts to form a tight insulating sheath around the cable.

Various methods have been used heretofore to manufacture heat shrinkable tubing, but a problem inherent in such production has been the difficulty in economically producing long lengths of tubing having a uniform outside diameter and uniform wall thickness and having controlled linear dimensions. It is toward solution of this problem that the present invention is directed.

It is an object of the present invention, therefore, to provide a machine and method for producing heat shrinkable tubing of constant diameter and wall thickness and having controlled linear dimensions. A further object is the provision of a machine and method for accomplishing this in an economical manner adaptable to large scale production.

In accordance with these and other objects there is provided by the present invention a device for producing heat shrinkable tubing wherein means are provided for uniformly expanding vulcanized tubing and then cooling it in its expanded position. Expansion is accomplished by means of air pressure while the tubing is heated and takes place within a solid pipe so that size may be closely controlled. While the tubing is maintained in its expanded condition it is cooled, causing it to set in its expanded condition.

Other objects and many attendant advantages of the invention will become better understood by those skilled in the art by a consideration of the following detailed description read in connection with the accompanying drawings wherein.

Figure 1:
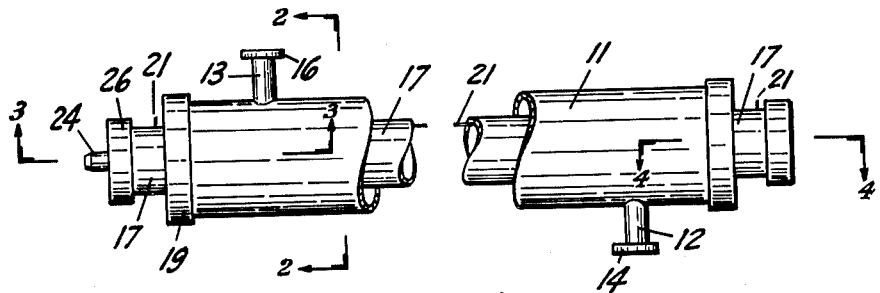
FIG. 1 is a side view in elevation of an embodiment of the invention.
Figure 2:
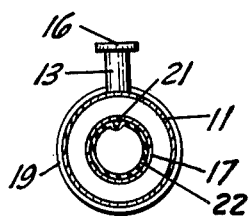
FIG. 2 is a cross-sectional view taken along the line 2—2 of FIG. 1.

Referring now to the drawings wherein like reference numerals designate like or corresponding parts throughout the several views, there is shown in FIG. 1 a jacket 11 which is provided with inlet and outlet pipes 12 and 13. The inlet and outlet pipes 12 and 13 have couplings 14 and 16 at their outer ends for connection to steam and cold water lines for reasons which will become apparent hereinafter with reference to operation of the device.

Figure 3:
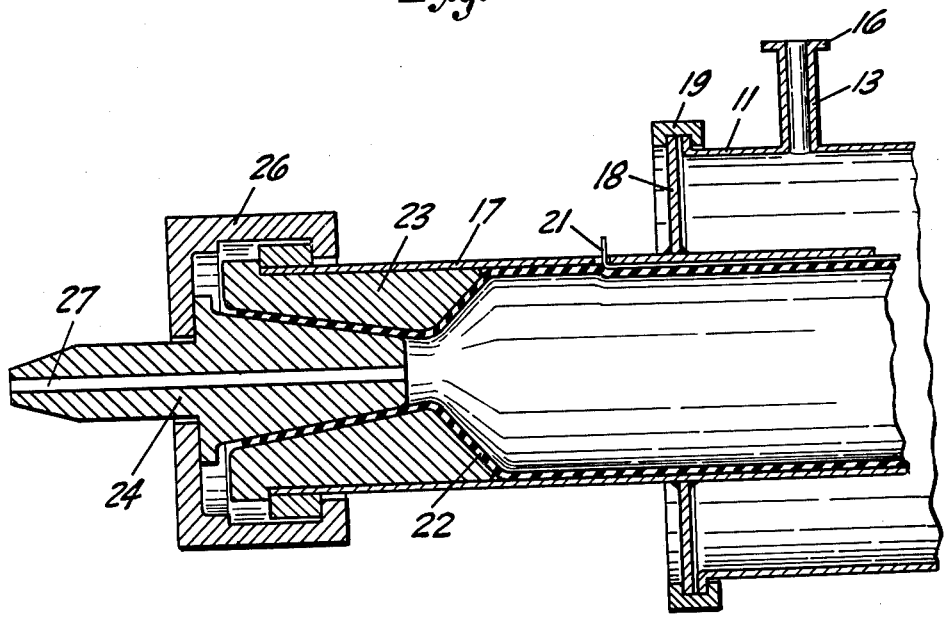
FIG. 3 is a longitudinal cross-sectional view of one end of the structure shown in FIG. 1, taken along the line 3—3 of that figure and showing the tubing in place.

A mold pipe 17 is mounted within the jacket 11 by any suitable means such as brazing or welding to a plate 18 as shown in FIG. 3. The mold pipe 17 may be made of any suitable rigid, heat conducting material, such as copper or the like, and has an internal diameter equal to the desired expanded external diameter of the heat shrinkable tubing to be formed. The plate 18 is preferably detachably coupled to the jacket 11 by means such as coupling 19, so that mold pipes of different sizes may be interchangeably inserted into the jacket. A wire 21 of small diameter relative to the thickness of the expanded wall of the tubing to be formed serves as air escape means along substantially the entire length of the tube as will be described hereinafter.

As may be seen more clearly from FIG. 3, a length of vulcanized heat shrinkable tubing 22 is inserted into the mold pipe 17 for expansion. A collar or the like 23, is placed in the end of the pipe 17 around the tubing 22 and a gas inlet fitting 24 having a tapered surface is inserted into the end of the tubing and wedges the tubing against the collar 23 to form a seal. A clamping ring 26 is used to secure the gas inlet fitting 24 in place in sealing relationship with the end of the tubing. The fitting 24 has a bore 27 extending axially through it to allow air or other gas to be injected into the tubing from a suitable source of compressed gas (not shown).

Figure 4:
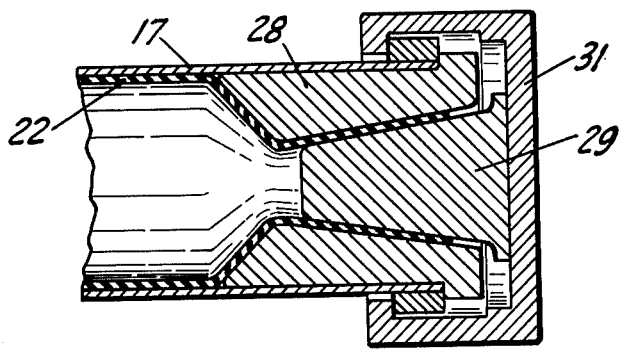
FIG. 4 is a longitudinal cross-sectional view of the other end of the structure shown in FIG. 1, taken along the line 4—4 of that figure and showing the tubing in place.

As shown in FIG. 4, the opposite end of the tubing 22 is sealed by any suitable means such as a collar 28, and a wedge plug 29 which is wedged into sealing relationship with collar 28 by a clamping ring 31.

With the tubing to be expanded held in the tube as shown in FIGS. 3 and 4, heat is applied to raise the tubing temperature sufficiently high to melt the crystalline material in the tube. This may be done by injection of superheated steam into the jacket 11 by connection of the inlet and outlet pipes 12 and 13 to a steam system. When the necessary tubing temperature has been reached, gas under pressure is injected into the tubing by means of the fitting 24 and the tubing is expanded to the internal diameter of the mold pipe 17. Alternatively, it is possible to expand the tubing prior to heating, if desired. The wire 21, due to the fact that the tubing will not completely envelop it, acts with the inner surface of the mold pipe 17 to form a channel to conduct any entrapped gases out of the mold pipe. This ensures diameter uniformity of the expanded pipe which, otherwise, would be likely to have sections of reduced diameter or irregular spots due to air bubbles entrapped as the pipe is expanded.

When the tubing has been expanded to fill the mold pipe, the jacket is cooled, for example, by connecting the inlet and outlet pipes 12 and 13 into a cold water system. Cooling causes the tubing to recrystallize in its expanded state, thereby holding the tube in its expanded condition as explained in the aforementioned patent and patent application.

Figure 5:
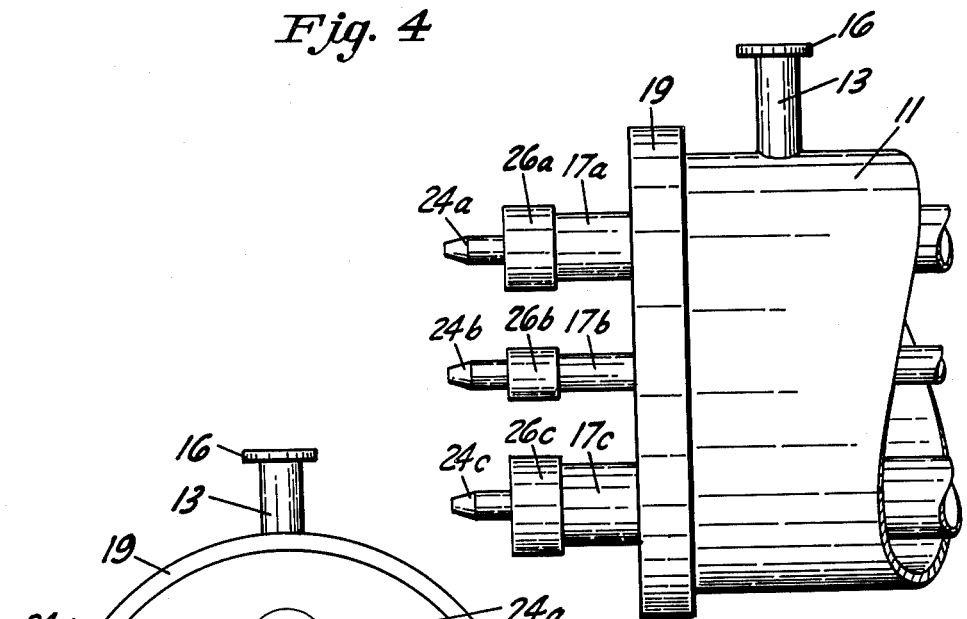
FIG. 5 is a broken view in elevation of an embodiment similar to FIG. 1, but wherein a number of tubes may be expanded at the same time.
Figure 6:
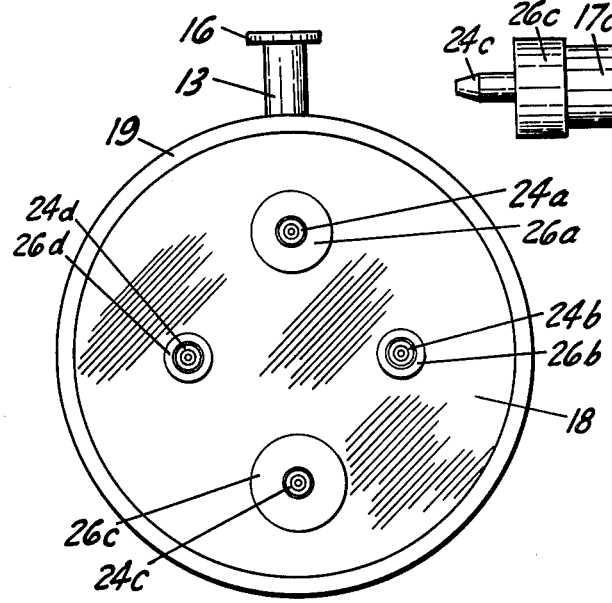
FIG. 6 is an end view in elevation of the embodiment shown in FIG. 4.

Many modifications of the basic invention are possible. For example, as shown in FIGS. 5 and 6, a number of mold pipes 17a–c may be provided in a single cooling jacket, thereby affording more economical operation. The pipes may all be of the same size or any number of different sizes may be provided. The mold pipes may be coated or lined with materials such as polyethylene, Teflon, and various other materials to facilitate release and prevent contamination.

The specific heating means, cooling means, coupling means, and sealing means shown hereinabove are shown by way of example and it is to be understood that means other than those shown may be used for these purposes. While a wire has advantages in its simplicity of installation, as gas escape means other structures, such as a groove in the mold pipe, fibers and ropings of various materials, among others, could be provided for this purpose.

Many other modifications and variations of the present invention are possible in the light of the foregoing description and will become obvious to those skilled in the art. Accordingly, it is to be understood that, within the scope of the appended claims, the invention may be practiced otherwise than as specifically described.

That which is claimed is:

1. A device for producing expanded tubing having plastic memory comprising:
   a mold pipe having an internal diameter substantially equal to the desired external diameter of the expanded tubing,
   means for expanding said tubing to the internal diameter of said mold pipe by heating said tubing and introducing air pressure within the tubing, thereby causing the desired expansion,
   means disposed along substantially the entire length of said mold pipe for conducting entrapped gases out of the area between said mold pipe and said tubing comprising a wire running substantially the length of said mold pipe.

2. A device as defined in claim 1 wherein said means for conducting entrapped gases out of the area between said mold pipe and said tubing comprises said wire and at least one vent to ambient air.

3. A device as defined in claim 1 wherein a hole is provided in the wall of said mold pipe proximate each end of said wire.

4. A device for eliminating entrapment of gases in a mold as said mold is filled, said device comprising a wire permanently affixed to said mold and running along the internal surface thereof, and at least one vent from said wire to ambient air.

References Cited by the Examiner

UNITED STATES PATENTS

| 1,392,576 | 10/1921 | Goodenberger. | |
| 2,826,784 | 3/1958 | Pratt | 18—19 |
| 2,938,237 | 5/1960 | Kern et al. | |
| 3,140,518 | 7/1964 | Kruithoff. | |
| 3,175,246 | 3/1965 | Loges et al. | 18—19 X |
| 3,182,355 | 5/1965 | Arnaudin | 18—19 |

WILLIAM J. STEPHENSON, *Primary Examiner.*